US008129875B2

(12) United States Patent
Murata

(10) Patent No.: US 8,129,875 B2
(45) Date of Patent: Mar. 6, 2012

(54) MOTOR COOLING STRUCTURE

(75) Inventor: Satoshi Murata, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 160 days.

(21) Appl. No.: 12/670,732

(22) PCT Filed: Nov. 3, 2008

(86) PCT No.: PCT/IB2008/002939
§ 371 (c)(1),
(2), (4) Date: Jan. 26, 2010

(87) PCT Pub. No.: WO2009/060280
PCT Pub. Date: May 14, 2009

(65) Prior Publication Data
US 2010/0231065 A1 Sep. 16, 2010

(30) Foreign Application Priority Data

Nov. 7, 2007 (JP) ................................ 2007-290099

(51) Int. Cl.
H02K 9/00 (2006.01)
(52) U.S. Cl. ............................... 310/54; 310/52; 310/59
(58) Field of Classification Search ............... 310/52–59
See application file for complete search history.

(56) References Cited

U.S. PATENT DOCUMENTS

| 4,197,476 | A | | 4/1980 | Lund et al. | |
| 4,413,201 | A | * | 11/1983 | Nikitin et al. | 310/260 |
| 4,739,204 | A | * | 4/1988 | Kitamura et al. | 310/68 D |
| 4,959,570 | A | * | 9/1990 | Nakamura et al. | 310/54 |
| 4,980,588 | A | * | 12/1990 | Ogawa | 310/68 D |
| 5,293,089 | A | * | 3/1994 | Frister | 310/54 |
| 6,160,332 | A | | 12/2000 | Tsuruhara | |
| 6,515,384 | B1 | * | 2/2003 | Kikuchi et al. | 310/58 |
| 6,657,331 | B2 | * | 12/2003 | Asao et al. | 310/54 |
| 2002/0043881 | A1 | * | 4/2002 | Asao et al. | 310/54 |
| 2008/0035399 | A1 | | 2/2008 | Murata et al. | |

FOREIGN PATENT DOCUMENTS

| FR | 2 788 385 A1 | 7/2000 |
| GB | 682486 | 11/1952 |
| JP | U-58-139864 | 9/1983 |
| JP | U-61-84663 | 5/1986 |
| JP | A-2000-116063 | 4/2000 |

(Continued)

OTHER PUBLICATIONS

International Search Report mailed on Oct. 14, 2009 in corresponding International Application No. PCT/IB2008/002939.
Written Opinion of the International Searching Authority mailed on Oct. 14, 2009 in corresponding International Application No. PCT/IB2008/002939.

(Continued)

Primary Examiner — Thanh Lam
(74) Attorney, Agent, or Firm — Oliff & Berridge, PLC

(57) ABSTRACT

A motor cooling structure includes a coil end cover interposed between a coil end and a motor case, a liquid passage, in which a cooling liquid flows, formed between the coil end cover and the coil end or the motor case. A micro-gap into which part of the cooling liquid in the liquid passage flows, is formed between the coil end cover and the coil end or the motor case by sandwiching the coil end cover between the coil end and the motor case instead of attaching the coil end cover to the coil end or the motor case.

10 Claims, 3 Drawing Sheets

FOREIGN PATENT DOCUMENTS

| | | |
|---|---|---|
| JP | A-2003-052155 | 2/2003 |
| JP | A-2003-219605 | 7/2003 |
| JP | A-2004-215353 | 7/2004 |
| JP | A-2005-348594 | 12/2005 |
| JP | A-2006-005984 | 1/2006 |
| JP | A-2006-033916 | 2/2006 |
| JP | A-2006-197772 | 7/2006 |
| WO | WO 2004/019468 A1 | 3/2004 |

OTHER PUBLICATIONS

Japanese Office Action issued Sep. 7, 2009 for Japanese Patent Application No. 2007-290099 (with translation).

Chinese Office Action issued in Application No. 200880101490.7; Dated Jul. 21, 2011 (With Translation).

* cited by examiner

MOTOR COOLING STRUCTURE

BACKGROUND OF THE INVENTION

1. Field of the Invention

The present invention relates to a motor cooling structure, specifically to a cooling structure that cools a motor including a coil end cover interposed between a coil end and a motor case.

2. Description of the Related Art

Cooling structures that cool a motor are conventionally known (for example, Japanese Patent Application Publication No. 2006-197772 (JP-A-2006-197772)). In the cooling structure, a coolant is supplied by a pump through a liquid passage to the coil of the motor. According to this cooling structure, the circulation of the coolant absorbs the heat generated by the motor, thereby cooling the motor.

In the cooling structure described in JP-A-2006-197772, the cooling efficiency of the motor may be improved by increasing the contact area between the coil end of the motor and a coolant. In a structure that cools the motor only by circulating the coolant in the liquid passage, the heat generated by the motor is absorbed by the coolant, and released to the outside. However, there is no other route for the heat to be released. Specifically, because air at the periphery of the coil end also acts as a heat insulator, a route that transfers the heat from the coil end to the motor case may be insufficient to adequately cool the motor.

SUMMARY OF THE INVENTION

The present invention provides a motor cooling structure, in which cooling efficiency is further improved.

A first aspect of the present invention is the cooling structure that cools the motor including a coil end cover interposed between a coil end and a motor case. Between the coil end cover and the coil end or the motor case, a micro-gap, into which a cooling liquid leaks, is provided.

In the invention of this aspect, the cooling liquid leaks into the micro-gap formed between the coil end cover and the coil end or the motor case. When the cooling liquid leaks to the micro-gap and flows, the cooling liquid displaces the air, which acts as a heat insulator, present in the micro-gap. If the cooling liquid exists in the micro-gap, the contact area between the coil end and the cooling liquid is increase in comparison to the case where air is present in the micro-gap, so the heat emitted from the coil end can easily transferred to the motor case. Therefore, according to the present invention, the heat generated by the motor can be efficiently released to the outside.

In the motor cooling structure described above, the coil end cover does not have to be attached to the coil end or the motor case, but may be sandwiched between the coil end and the motor case.

According to the invention of this aspect, a micro-gap is formed both between the coil end and the coil end cover and between the coil end cover and the motor case, so that the cooling liquid can leak into the micro-gap. Therefore, according to the present aspect, the heat generated by the motor may be efficiently released to the outside. Also, the coil end cover is not attached to the coil end or the motor case, thus, the assembly process is simpler, and the coil end itself or the motor case itself or the coil end cover itself does not have to be formed precisely. Therefore, according to the present aspect, motor assembly is simplified, and the cooling structure may be produced at lower cost.

In the motor cooling structure described above, it is also acceptable to form the liquid passage between the coil end cover and the coil end or the motor case, and to have part of the cooling liquid flowing in the liquid passage leak into the micro-gap.

According to this aspect of the present invention, the heat emitted from the coil end may be released to the outside by the cooling liquid flowing in the liquid passage. At the same time, the heat may be furthermore released to the outside by the cooling liquid that has leaked into the micro-gap. Therefore, according to the present invention, the heat generated by the motor can be efficiently released to the outside.

In the motor cooling structure described above, the liquid passage may be formed in the annular shape and in plural numbers along the coil end.

According to this aspect of the present invention, the heat generated by the motor can be easily released to the outside, thus surface temperature of the coil end can be equalized.

In the motor cooling structure described above, the liquid passage may be formed so that the cooling liquid flowing in the liquid passage is introduced to a motor support bearing.

According to this aspect of the present invention, the cooling liquid supplied to the liquid passage may be introduced to the motor support bearing, so the motor support bearing is lubricated by the cooling liquid, which is used for absorbing the heat generated by the motor.

Furthermore, in the motor cooling structure described above, the coil end cover may be constituted by an insulating member that has heat conductivity of a specified value or larger.

According to this aspect of the present invention, the motor coil and the motor case may be securely insulated while releasing the heat generated by the motor with higher efficiency.

According to the present invention, cooling efficiency in releasing the heat generated by the motor can be further improved.

BRIEF DESCRIPTION OF THE DRAWINGS

The foregoing and further features and advantages, of the invention will become apparent from the following description of example embodiments with reference to the accompanying drawings, wherein like numerals are used to represent like elements, and wherein.

DETAILED DESCRIPTION OF THE EMBODIMENTS

Figure 1:
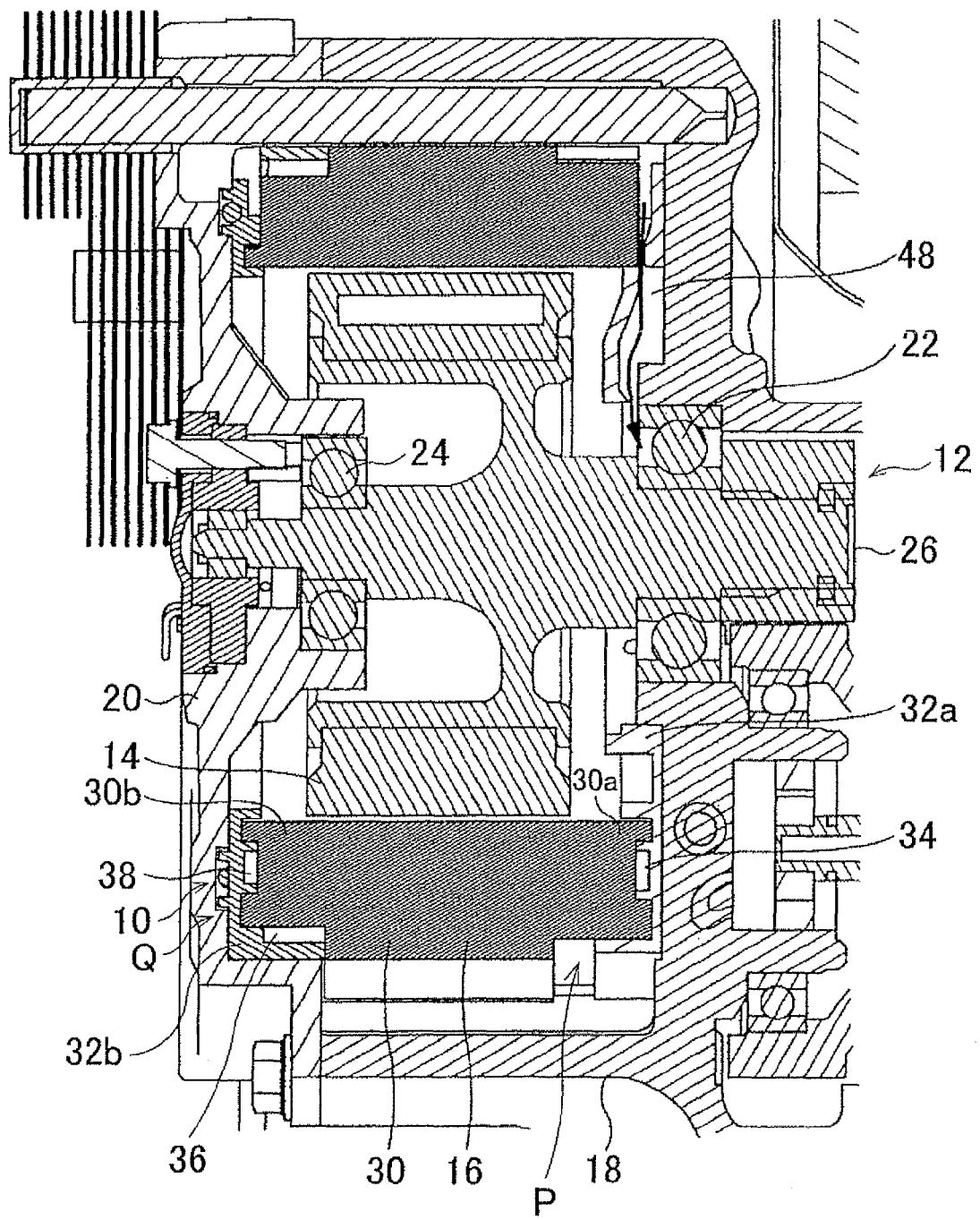
FIG. 1 is a cross sectional view of a motor including a cooling structure according to an embodiment of the present invention.
Figure 2:
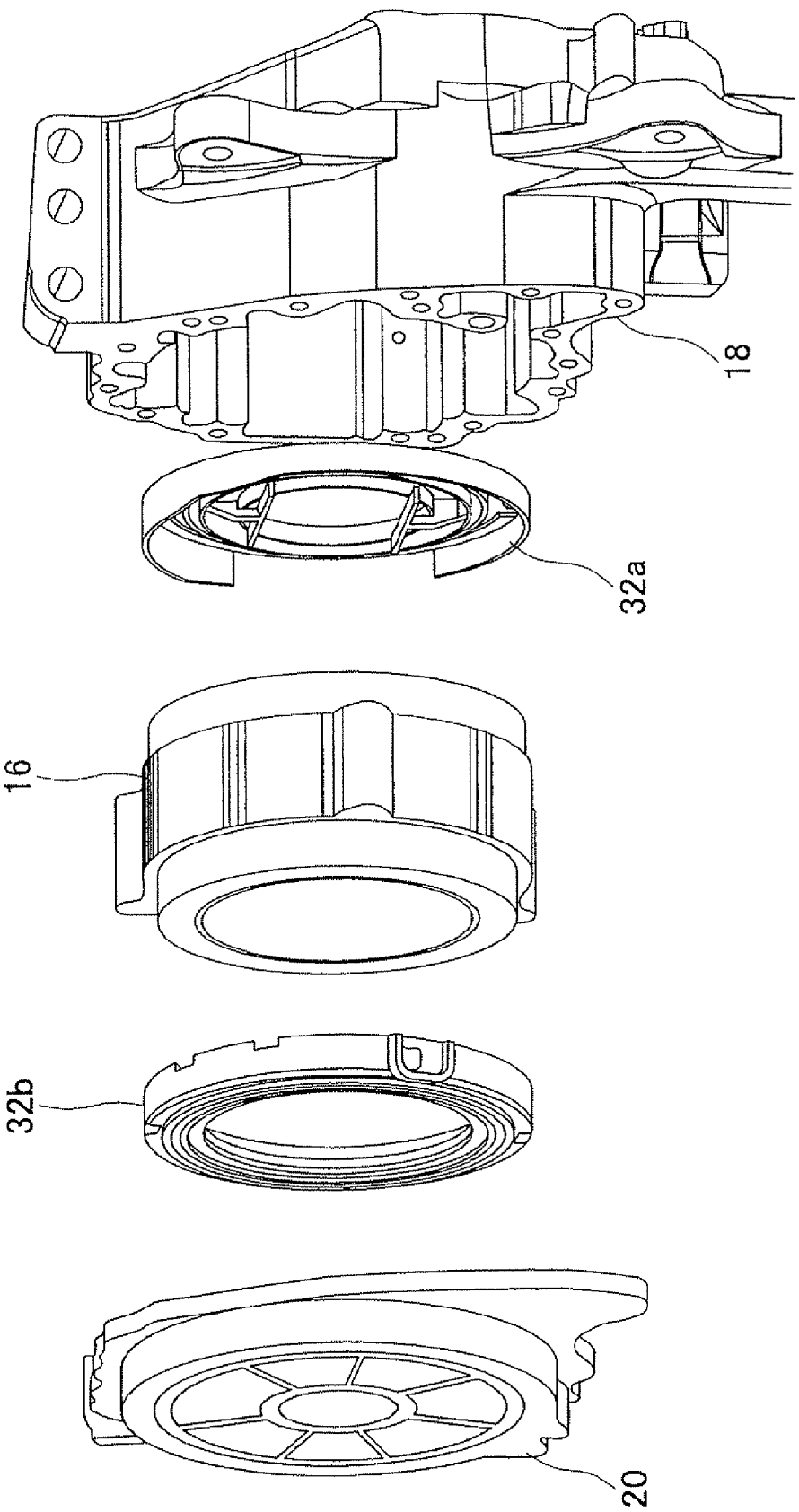
FIG. 2 is an exploded perspective view of the motor according to the present embodiment.
Figure 3:
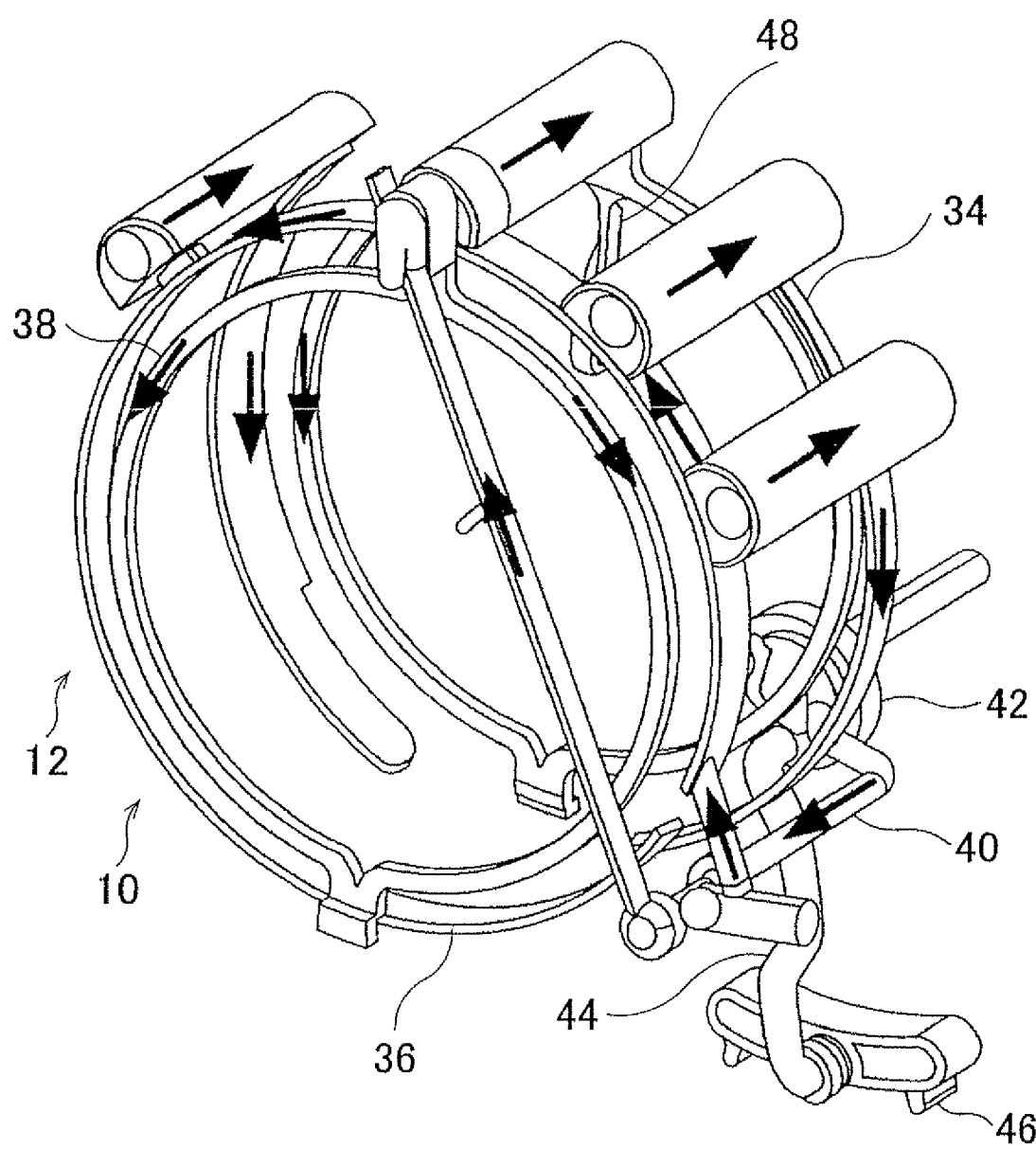
FIG. 3 is a perspective view of a liquid passage that is included in a motor cooling structure according to the present embodiment.

FIG. 1 shows a cross section of a motor 12 that includes a cooling structure 10 according to an embodiment of the present invention. FIG. 2 shows an exploded perspective view of the motor 12. FIG. 3 shows a perspective view of the liquid passage included in the cooling structure 10 of the motor 12. The motor 12 is a device that generates a drive force to drive a vehicle wheel, for example.

In the present embodiment, the motor 12 includes a rotor 14 and a stator 16. The rotor 14 and the stator 16 are housed in a metal motor case 18. An internal space, which houses the rotor 14 and the stator 16, is formed in the motor case 18. A motor case cover 20 in the shape of a disc is bolted to the motor case 18 from the outside (left side in FIG. 1), when the rotor 14 and the stator 16 are housed in the internal space of the motor case 18. The rotor 14 is fixed on the periphery of a rotor shaft 26, which is rotatably supported through the motor support bearings 22 and 24 to the motor case 18 and the motor case cover 20. The rotor 14 rotates integrally with the rotor shaft 26.

The stator 16 is formed in the shape of a cylinder that accommodates the rotor 14 inside. An inner wall of the stator 16 and an outer wall of the rotor 14 are arranged a certain distance apart in radial direction and separated by a gap. The stator 16 is attached to the motor case 18 on a projection provided on the outer wall of the cylinder. The stator 16 includes a stator core and a coil 30 wound on the stator core. The coil 30 is constituted by enamel-coated wire, or molded by resin, and supported by the stator core.

The axial ends (coil ends) 30a and 30b of the coil 30 of the stator 16 is covered by coil end covers 32a and 32b from the outside. The coil end covers 32a and 32b are formed generally in the annular shape to cover all the coil ends 30a and 30b lined up circumferentially. Specifically, the coil end covers 32a and 32b are shaped to cover the coil ends 30a and 30b from the axial outside and the radial outside. The coil end covers 32a and 32b are constituted by an insulating member that has a heat conductivity higher than the heat conductivity of air.

The coil end covers 32a and 32b are interposed between the coil end 30a of the stator 16 and the motor case 18 or between the coil end 30b and the motor case cover 20, after the motor case cover 20 is bolted to the motor case 18. However, the coil end covers 32a and 32b are not bolted to or fixed by an adhesive to the coil ends 30a and 30b, the motor case 18, or the motor case cover 20. The coil end covers 32a and 32b are sandwiched between the coil end 30a and the motor case 18 or between the coil end 30b and the motor case cover 20.

For this reason, micro-gaps P and Q are formed, with micro-gap P formed between the coil end cover 32a and the motor case 18 or between the coil end cover 32a and the coil end 30a and micro-gap Q formed between the coil end cover 32b and the motor case cover 20 or between the coil end cover 32b and the coil end 30b. The micro-gaps P and Q may be connected to liquid passages 34, 36, and 38, and are size to allow capillary motion. Part of a coolant (a cooling liquid) flowing in the passages 34, 36, and 38 is drawn from the passages 34, 36, and 38 to the micro-gaps P and Q.

The motor 12 includes a cooling structure 10. The cooling structure 10 includes the liquid passages 34, 36, and 38, which introduce a cooling liquid to the coil ends 30a and 30b of the motor 12. The liquid passages 34, 36, and 38 are constituted by a groove formed on one surface of the coil end covers 32a and 32b (specifically, on the surface of the axial inside and on the flange surface of the radial inside). The liquid passages 34, 36 and 38 are passages formed by a space surrounded by an outer wall of the coil ends 30a and 30b and the groove of the coil end covers 32a and 32b. The liquid passages 34, 36, and 38 are formed between the coil ends 30a and 30b and the coil end covers 32a and 32b. The liquid passages 34, 36, and 38 are generally in the annular shape so as to come along with all the coil ends 30a and 30h lined up circumferentially with the rotor shaft 26 of the motor 12 as a center.

The upstream side of the liquid passages 34, 36, and 38 is connected to a single communication passage 40. A pump 42 is connected to the communication passage 40. A reservoir, in which the coolant is collected, is connected through a suction port 44 and a strainer 46 to the pump 42. The pump 42 draws the cooling liquid from the reservoir and supplies the cooling liquid by high pressure through the communication passage 40 to the liquid passages 34, 36, and 38. The cooling liquid is generally an oil that used to absorb the heat generated by the motor 12 and also to lubricate the motor.

A downstream side of the liquid passages 34, 36, and 38 is connected to the reservoir described above. A cooling liquid flowed through the liquid passages 34, 36, and 38 is discharged from the outlet and then returned to the reservoir.

A cooler, which cools the heated cooling liquid, may be disposed between a downstream side of the liquid passages 34, 36, and 38 and the reservoir, for example. In this case, the cooling liquid from the liquid passage 34, 36, and 38 is discharged through the outlet, and cooled by the cooler, and then returned to the reservoir.

A branch passage 48 is connected to the liquid passages 34, 36, and 38 (specifically, part of them; or the liquid passage 34 in the present embodiment). The branch passage 48 is constituted so that the outlet thereof opens towards the motor support bearing 22. Some of the cooling liquid introduced from the reservoir to the liquid passages 34, 36, and 38 is supplied to the branch passage 48. The cooling liquid supplied to the branch passage 48 passes through the branch passage 48, and then supplied to the motor support bearing 22 (refer to an arrow shown in FIG. 1). The cooling liquid supplied to the motor support bearing 22 drops by gravity after lubricating the motor support bearing 22, and then returns to the reservoir.

In the cooling structure 10 of the motor 12, the cooling liquid collected in the reservoir is pumped up by the pump 42, and passes through the strainer 46 and the suction port 44, and then discharged to the communication passage 40 on the downstream side of the pump 42. The cooling liquid discharged to the communication passage 40 is supplied to the liquid passages 34, 36, and 38. Most of cooling liquid supplied to the liquid passages 34, 36, and 38 absorbs the heat generated by the motor 12 while flowing through the generally annular shaped passages 34, 36, 38 and while contacting the coil ends 30a, 30b of the motor 12. The cooling liquid that has reached the outlet of the liquid passages 34, 36, and 38 is discharged and returned to the reservoir. Accordingly, in the present embodiment, the cooling liquid in the reservoir circulates through the liquid passages 34, 36, and 38, and cools the motor 12.

The liquid passages 34, 36, and 38 are formed so that the cooling liquid flowing in the passages 34, 36, and 38 is partly introduced to the motor support bearing 22, and connected to the branch passage 48. In such a structure, part of the cooling liquid, which is supplied from the communication passage 40 to the liquid passages 34, 36, and 38, is supplied to the branch passage 48. The cooling liquid supplied to the branch passage 48 is supplied to the motor support bearing 22. The cooling liquid supplied to the motor support bearing 22 is later returned to the reservoir. Therefore, in the present embodiment, the cooling liquid in the reservoir is introduced to the motor support bearing 22 to lubricate the motor support bearing 22.

According to this structure, a dedicated passage to introduce lubricating oil from the reservoir to lubricate the motor support bearing 22 need not to be disposed separately from the liquid passages 34, 36, and 38. That is, a cooling liquid, which is introduced from the reservoir to the liquid passages 34, 36, and 38, is partly used to cool the motor 12, and the rest is used to lubricate the motor support bearing 22. Therefore, a constitution to introduce a liquid from the reservoir need not to be established separately, and the motor support bearing 22 is lubricated by using a cooling liquid for absorbing the heat generated by the motor 12. Thus, according to the present invention, a constitution to introduce a cooling liquid to the motor 12 and to introduce lubricating oil to the motor support bearing 22 may be easily realized.

In the cooling structure 10 of the motor 12 described above, the liquid passages 34, 36, and 38, are formed between the coil ends 30a and 30b and the coil end covers 32a and 32b. The formation is realized by that the coil end covers 32a and 32b are molded so that the grooves constituting the passages 34, 36, 38, are formed on the surface. For this reason, a groove or the like need not to be formed on the surface of the motor case 18 and the motor case cover 20 in order to form the liquid passages 34, 36, and 38. It is sufficient if a groove is formed on the surface of the coil end covers 32a and 32b, which are interposed between the coil ends 30a and 30b and the motor case 18 or the motor case cover 20 and cover the coil ends 30a and 30b from the outside. According to the present embodiment, the liquid passages 34, 36, and 38 may be constituted easily by molding the coil end covers 32a and 32b.

The coil end covers 32a and 32b are constituted by an insulating member as described above. According to the present embodiment, if the enamel coated wire of the coil 30 or the resin of the resin mold is broken, shorting of the coil 30 to the metal motor case 18 and the motor case cover 20 can be prevented. Thus, insulation of the coil 30 from the motor case 18 and the motor case cover 20 may be securely maintained.

In the cooling structure 10 of the motor 12 of the present embodiment, the coil end covers 32a and 32b are respectively sandwiched between the coil end 30a and the motor case 18 and between the coil end 30b and the motor case cover 20. Therefore, the micro-gap P may be formed between the coil end cover 32a and the motor case 18 or between the coil end cover 32a and the coil end 30a, and the micro-gap Q may be formed between the coil end cover 32b and the motor case cover 20 or between the coil end cover 32b and the coil end 30b.

These micro-gaps P and Q are connected to the liquid passages 34, 36, and 38 in which the cooling liquid is introduced. Thus, the cooling liquid, which flows in the liquid passages 34, 36, and 38, leaks slightly, and part of it is introduced to the micro gaps P and Q.

In this case, the cooling liquid enters the micro-gaps P and Q and thereby displaces air, which exists as a heat insulator in the micro-gaps P and Q, from the micro-gaps P and Q. Therefore, the heat generated by the motor 12 does not remain in the micro-gaps P and Q, but is released to the outside.

In the case described above, the cooling liquid entering the micro-gaps P and Q remains in the micro-gaps P and Q, so the heat generated by the motor 12 is transferred from the coil end 30a or 30b, to the cooling liquid, to the coil end cover 32a or 32b, to the cooling liquid, and to a motor case 18 or to the motor case cover 20, in this order. The coil end covers 32a and 32b has heat conductivity that is higher than that of air. Therefore, the heat generated by the motor 12 is easily transmitted through the cooling liquid and the coil end covers 32a and 32b to the motor case 18 and the motor case cover 20.

Furthermore, if a cooling liquid remains in the micro-gaps P and Q, the contact area between the coil ends 30a and 30b and the cooling liquid increases in comparison to the constitution in which the cooling liquid does not remain. Therefore, the heat generated by the motor 12 becomes further easily transmitted to the motor case 18 and the motor case cover 20, and surface temperature of the coil ends 30a and 30b is equalized.

According to the cooling structure 10 of the present embodiment, the heat generated by the motor 12 is efficiently released to the outside, and the efficiency in cooling the motor 12 is further improved.

In the present embodiment, to improve the efficiency in cooling the motor 12, as described above, the micro-gap P may be formed between the coil end cover 32a and the motor case 18 or between the coil end cover 32a and the coil end 30a, and the micro-gap Q may be formed between the coil end cover 32b and the motor case cover 20 or between the coil end cover 32b and the coil end 30b. The micro-gaps P and Q are formed by sandwiching the coil end covers 32a and 32b between the coil ends 30a and 30b, the motor case 18, and the motor case cover 20, instead of fixing the coil end covers 32a and 32b to the coil ends 30a and 30b, the motor case 18, and the motor case cover 20.

For this reason, the attachment of the coil end covers 32a and 32b during the assembly of the motor 12 may be omitted. Also, when the micro-gaps P and Q described above are established, the coil ends 30a and 30b, the motor case 18 and the motor case cover 20, and the coil end covers 32a and 32b, need not to be formed precisely. According to the present embodiment, the motor 12, which includes the cooling structure 10 to cool the stator 16, may be manufactured reasonably and simply, and motor assembly is simplified, and the cooling structure 10 may be realized by reasonable constitution.

In the present embodiment, the micro-gaps formed as described above are filled with a cooling liquid leaked from the liquid passages 34, 36, and 38. Therefore, contacting sounds or impacts between members (specifically, between coil end covers 32a and 32b and the coil ends 30a and 30b or the motor case 18 or the motor case cover 20) caused by the existence of the micro-gaps P and Q are alleviated. According to the motor 12 of the present embodiment, occurrences of contacting sounds caused by the existence of the micro-gaps P and Q may be restrained, and damage of the member may be minimized.

In the embodiment described above, the cylindrically shaped motor case 18, and the annularly shaped motor case cover 20 bolted to the motor case 18, are non-limiting embodiments of the "motor case" of the present invention.

In the embodiment described above, the liquid passages 34, 36, and 38 of the generally annular shape are disposed between the coil ends 30a and 30b and the coil end covers 32a and 32b. However, the number of liquid passage may be set as appropriate based on the relationship between the pressure of the cooling liquid flowing in the liquid passage and the contact area between the coil ends 30a and 30b and the cooling liquid. An embodiment with one liquid passage is also applicable depending on the situation.

The invention claimed is:

1. A motor cooling structure comprising:
   a motor case that encases a motor;
   a coil end cover that is arranged between the motor case and a coil of the motor and that covers a coil end of the coil;
   a liquid passage, in which a cooling liquid flows, disposed in the coil end cover; and
   a pump that supplies the cooling liquid to the liquid passage,
   wherein a micro-gap, into which the cooling liquid leaks, is formed between the coil end cover and at least one of the motor case and the coil end.

2. The cooling structure according to claim 1, wherein the coil end cover is not attached to the coil end or the motor case, but sandwiched between the coil end and the motor case.

3. The a cooling structure according to claim 1, wherein
the liquid passage, in which the cooling liquid flows, is formed between the coil end cover and at least one of the coil end and the motor case; and
part of the cooling liquid flowing in the liquid passage leaks to the micro-gap.

4. The cooling structure according to claim 3, wherein
the liquid passage is formed in an annular shape and in plural numbers along the coil end.

5. The a cooling structure according to claim 3, wherein
the liquid passage is formed so that the cooling liquid is introduced to a motor support bearing.

6. The cooling structure according to claim 1, wherein
the coil end cover is constituted by an insulating member having a heat conductivity at least a specific value.

7. The cooling structure according to claim 6, wherein
the heat conductivity of the coil end cover is higher than the heat conductivity of air.

8. The cooling structure according to claim 1, wherein
the cooling liquid is a lubricating oil.

9. The cooling structure according to claim 1, wherein
the micro-gap is sized to allow capillary movement by the cooling liquid.

10. The cooling structure according to claim 3, wherein
a groove in the coil end cover forms the liquid passage.

* * * * *